May 9, 1950    B. G. MAYNARD    2,507,035
PLASTIC INSTRUMENT PANEL
Filed May 16, 1945
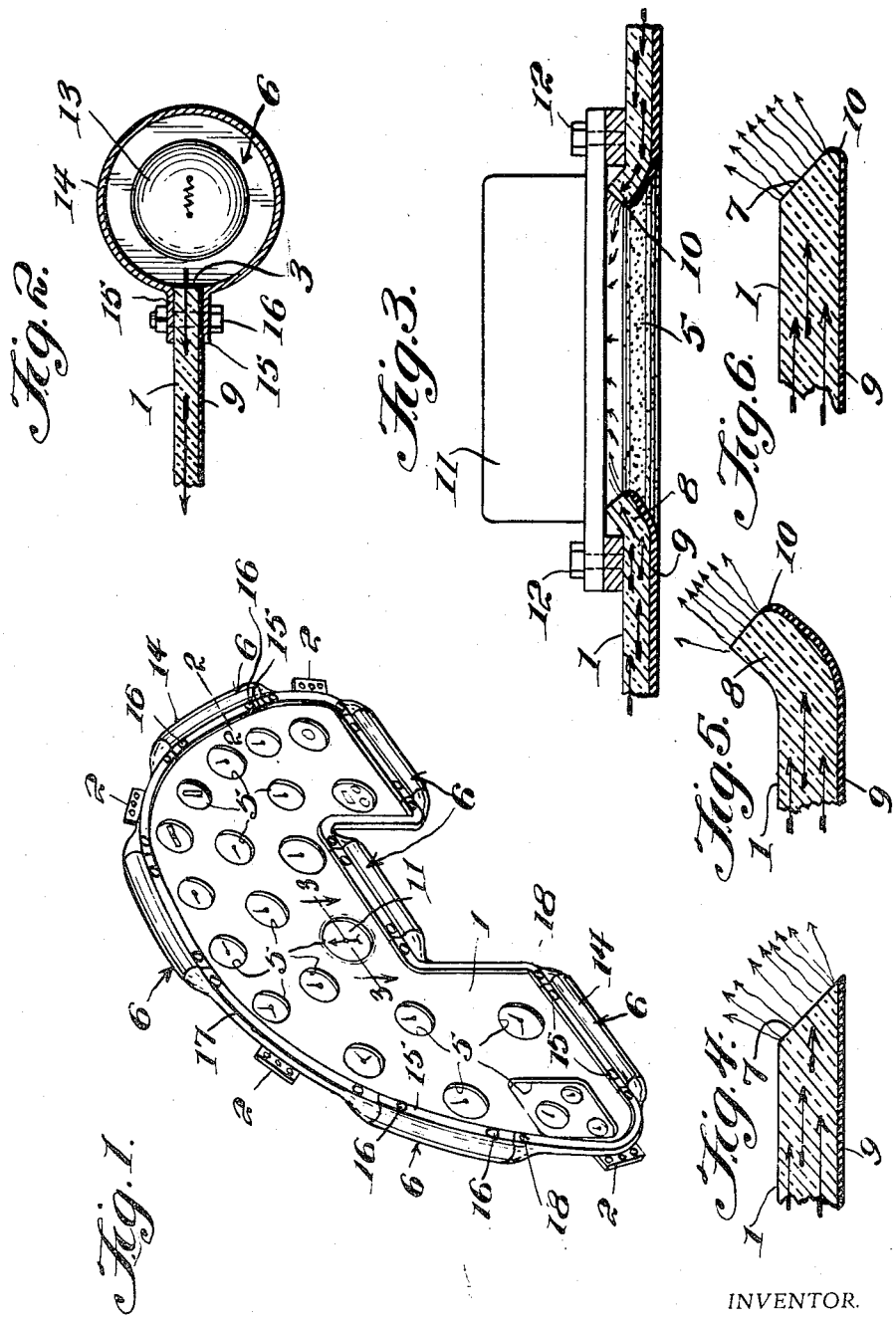
INVENTOR.
B. G. Maynard
BY Victor J. Evans & Co.
ATTORNEYS Patented May 9, 1950

2,507,035

UNITED STATES PATENT OFFICE 2,507,035

PLASTIC INSTRUMENT PANEL

Bert G. Maynard, Grand Rapids, Mich.

Application May 16, 1945, Serial No. 594,117

10 Claims. (Cl. 240—8.16)

My present invention, in its broad aspect, has to do with improvements in illuminated instrument panels of plastic, especially plastics of the type known commercially as Lucite, Plexiglas, and the like, and which are, I am advised, chemically defined as methyl methacrylate base plastics which have the characteristics of light weight, high strength, high fatigue life, and the unusual ability to absorb light rays and transmit such light rays parallel to the finished surface and running 90 degrees normal to the line of vision, or "piping" these rays within the sheet of plastic to points relatively distant from the light source. It is my purpose to utilize this light transmitting characteristic of Lucite or Plexiglas in instrument panels.

My present invention has the advantage of transmitting light from remote sources directly to the instruments in the panel, that is "piping" the light, through the body of the plastic panel, and then by properly forming the edges of the instrument openings illuminate such instruments. I thus attain not only a novel and practical method and means of illuminating the instruments, but also the additional advantages of these particular forms of plastic for instrument panels, namely, strength, durability, cheapness of manufacture, safety, non-glare, ease in shaping and forming, and general adaptability for the purpose intended. In utilizing my panel for purposes of illumination, the front face should be treated with opaque material, and the lamp or source of illumination aligned with the plane of the instrument panel and mounted midthickness therewith, and edges where the light enters and leaves the panel properly polished. Openings for instruments are preferably beveled at 45 degrees, or the sheet may be turned to project the light where desired from the edge.

Other and equally important objects and advantages of my invention will be apparent from the following description taken with the accompanying drawings, but it is to be understood that the specific form shown is for purposes of illustration only and that changes may be made in size, form, shape, material, arrangement and construction, without departing from my broad inventive concept or the scope of the appended claims.

In the drawings wherein a form of my invention is illustrated—

Figure 1 is a perspective view of an instrument panel formed of plastic after the teachings of my invention;

Figure 2 is a section on the line 2—2 of Figure 1 showing the disposition of the light source;

Figure 3 is a section on the line 3—3 of Figure 1 showing a form of instrument panel opening with the edges of the panel turned or bent to direct the light rays in the face of the instrument;

Figure 4 is a sectional detail showing the edge of an instrument opening beveled to direct the light rays;

Figure 5 is a sectional detail showing the edge of an instrument opening bent or turned to direct the light rays, and Figure 6 is a sectional detail showing the opaque material extending around the rounded edge of one of the beveled edges to cut off stray light rays.

In the drawings wherein like characters of reference are used to designate like or similar parts throughout the several views:

The numeral 1 designates an instrument panel formed of Lucite or Plexiglas, which I am advised, are chemically defined as methyl methacrylate base plastics, and which have the unusual ability to absorb light rays and effectively transmit or "pipe" such rays within the sheet from a light source to points relatively distant. This material also has characteristics of non-glare, durability, non-shatterability, light weight, and high fatigue life. The panel has a concaved edge 3 and a plurality of instrument openings 5. At various points about the edges of the panel are arranged sources of light 6.

Referring now to Figures 4 and 5, it will be seen that since the plastic material has the ability to transmit light at 90 degrees from the plane of vision or parallel to the finished surface of the panel, the edges of the instrument openings are beveled (preferably at 45 degrees) as in Figure 4, or turned or bent at about 45 degrees as in Figure 5, to direct the rays on the face of the instrument. The beveled edge is designated by 7 and the turned edge at 8. The front face of the panel is treated with opaque paint 9 or the like, and as shown in both Figures 5 and 6 where a rounded edge is adjacent an instrument opening the edge is treated with the opaque material as at 10. An instrument 11— (see Figure 3—may be bolted or otherwise attached to the panel as at 12 back of the opening 5.

I have found that the light source is aligned in the plane of the sheet and midway its thickness. To this end, a bulb 13 may be held in a circular housing 14 having meeting flanged edges 15 engaging on opposite sides of the panel and secured thereto by fastening means 16, as in Figure 2, to arrange the bulb midway the thickness of the edge and aligned with the surface of the panel. As previously stated, a number of these light sources may be mounted around the panel.

Interposed between the flanged edges 15 of the housing 14 and following the contour of the panel 1 are the reinforcing channel members 17 which are fastened thereto by any well known fastening means 18 and are provided with attaching ears 2 for supporting the panel 1 in position.

From the foregoing, it is believed that the operation and advantages of my invention will be apparent, but interpretation of its scope should only be conclusive when made in the light of the subjoined claims.

I claim:

1. An instrument panel formed from a sheet of transparent material having a front and a rear face and having a plurality of openings extending from front to rear faces, a plurality of instruments having indicating means, means mounting the instruments against the rear face and in alignment with said openings exposing said indicating means to an observer facing the front face of the panel, a plurality of sources of illumination distributed about and secured to the edges of said panel whereby the light rays are directed and distributed through the panel, each of said openings having the peripheral edges thereof provided with a substantially 45 degree bevel directed toward the respective instrument whereby the light rays from said sources of illumination are directed therefrom to the indicating means of said instruments for illuminating the same, and an opaque means completely masking the surface of the front face of the panel to prevent light from the sources of illumination, other than that reflected from the instrument indicating means, from reaching the observer facing or viewing such dials.

2. An instrument panel formed from sheet plastic having a methyl methacrylate base, said panel having a front and a rear face and having a plurality of openings extending from front to rear faces, a plurality of instruments having indicating means, means mounting the instruments against the rear face and in alignment with said openings exposing said indicating means to an observer facing the front face of the panel, a plurality of sources of illumination distributed about and secured to the edges of said panel whereby the light rays are directed and distributed through the panel, each of said openings having the peripheral edges thereof provided with a substantially 45 degree bevel directed toward the respective instrument whereby the light rays from said sources of illumination are directed therefrom to the indicating means of said instruments for illuminating the same, and an opaque means completely masking the surface of the front face of the panel to prevent light from the sources of illumination, other than that reflected from the instrument indicating means, from reaching the observer facing or viewing such dials.

3. An instrument panel formed from sheet plastic having a methyl methacrylate base, said panel having a front and a rear face and having a plurality of openings extending from front to rear faces, a plurality of instruments having indicating means, means mounting the instruments against the rear face and in alignment with said openings exposing said indicating means to an observer facing the front face of the panel, a plurality of sources of illumination distributed about and secured to the edges of said panel whereby the light rays are directed and distributed through the panel, each of said openings having the peripheral edges thereof provided with a substantially 45 degree bevel directed toward the respective instrument whereby the light from said sources of illumination are directed therefrom to the indicating means of said instruments for illuminating the same, a non-transparent coating covering the surface of the front face of the panel to prevent light from the sources of illumination, other than that reflection from the instrument indicating means, from reaching the observer facing or viewing such dials.

4. An instrument panel formed from sheet plastic having a methyl methacrylate base, said panel having a front and a rear face and having a plurality of openings extending from front to rear faces, a plurality of instruments having indicating means, means mounting the instruments against the rear face and in alignment with said openings exposing said indicating means to an observer facing the front face of the panel, a plurality of sources of illumination distributed about and secured to the edges of said panel whereby the light rays are directed and distributed through the panel, each of said openings having the peripheral edges thereof provided with a substantially 45 degree bevel directed toward the respective instrument whereby the light rays from said sources of illumination are directed therefrom to the indicating means of said instruments for illuminating the same, a non-transparent coating covering the surface of the front face of the panel to prevent light from the sources of illumination, other than that reflected from the instrument indicating means, from reaching the observer facing or viewing such dials, each of said sources of illumination having the filaments thereof aligned in the plane of and midway of the thickness of the panel.

5. An instrument panel formed from a sheet of transparent material having a front and a rear face and having a plurality of openings extending from front to rear faces, a plurality of instruments having indicating means, means mounting the instruments against the rear face and in alignment with said openings exposing said indicating means to an observer facing the front face of the panel, a plurality of sources of illumination distributed about and secured to the edges of said panel whereby the light rays are directed and distributed through the panel, each of said openings having the peripheral edges thereof directed inwardly away from the surface of the front face and towards the respective instrument whereby the light rays from said sources of illumination are directed therefrom to the indicating means of said instruments for illuminating the same, and an opaque means completely masking the surface of the front face of the panel to prevent light from the sources of illumination, other than that reflected from the instrument indicating means, from reaching the observer facing or viewing such dials.

6. An instrument panel formed from a sheet of transparent material having a front and a rear face and having a plurality of openings extending from front to rear faces, a plurality of instruments having indicating means, means mounting the instruments against the rear face and in alignment with said openings exposing said indicating means to an observer facing the front face of the panel, a plurality of sources of illumination distributed about and secured to the edges of said panel whereby the light rays are directed and distributed through the panel, each of said openings having the peripheral edges thereof bent in substantially 45 degrees to the plane of the surface of the front face of the panel and toward the respective instrument whereby the light rays from said sources of illumination are directed therefrom to the indicating means of said instruments for illuminating the same, and an opaque means completely masking the surface of the front face of the panel to prevent light from the sources of illumination, other than that reflected from the instrument indicating means, from reaching the observer facing or viewing such dials.

7. An instrument panel formed from a sheet of transparent material, a transverse opening therethrough, an indicating instrument adapted to be viewed by an observer, a means mounting the instrument against the transparent sheet and in alignment with said opening to expose said instrument for direct observation through said opening by the observer, a source of illumination directed against a side of said transparent sheet, said opening having the peripheral edges thereof directed towards said instrument whereby the light rays from the source of illumination are directed therefrom to the instrument for illuminating the same, an opaque means masking the surfaces of the transparent material to prevent light rays from the source of illumination, other than that reflected from the instrument, from reaching the observer.

8. An instrument panel formed from a sheet of transparent material, a transverse opening therethrough, an indicating instrument adapted to be viewed by an observer, a means mounting the instrument against the transparent sheet and in alignment with said opening to expose said instrument for direct observation through said opening by the observer, a source of illumination directed against a side of said transparent sheet, said opening having the peripheral edges thereof provided with a bevel directed inwardly of the opening at substantially 45 degrees to the plane of said sheet material and towards said instrument whereby the light rays from the source of illumination are directed therefrom to the instrument for illuminating the same, an opaque means masking the surfaces of the transparent material to prevent light rays from the source of illumination, other than that reflected from the instrument, from reaching the observer.

9. An instrument panel formed from a sheet of transparent material, a transverse opening therethrough, an indicating instrument adapted to be viewed by an observer, a means mounting the instrument against the transparent sheet and in alignment with said opening to expose said instrument for direct observation through said opening by the observer, a source of illumination directed against a side of said transparent sheet, said opening having the peripheral edges thereof provided with portions bent inwardly of the opening at substantially 45 degrees to the plane of said sheet material and directed towards said instrument whereby the light rays from the source of illumination are directed therefrom to the instrument for illuminating the same, an opaque means masking the surfaces of the transparent material to prevent light rays from the source of illumination, other than that reflected from the instrument, from reaching the observer.

10. An instrument panel formed from a sheet of transparent material, a transverse opening therethrough, an indicating instrument adapted to be viewed by an observer, a means mounting the instrument against the transparent sheet and in alignment with said opening to expose said instrument for direct observation through said opening by the observer, a source of illumination directed against a side of said transparent material, said opening having the peripheral edges thereof provided with a beveled portion directed inwardly of the opening and towards said instrument whereby the light rays from the source of illumination are directed therefrom to the instrument for illuminating the same, an opaque means masking the surfaces of the transparent material to prevent light rays from the source of illumination, other than that reflected from the instrument, from reaching the observer.

BERT G. MAYNARD.

REFERENCES CITED

The following references are of record in the file of this patent:

UNITED STATES PATENTS

| Number | Name | Date |
|---|---|---|
| 750,787 | Blodgett | Jan. 26, 1904 |
| 1,467,636 | Hammond | Sept. 11, 1923 |
| 1,739,954 | du Pont | Dec. 17, 1929 |
| 1,965,865 | Thompson | July 10, 1934 |
| 2,022,175 | Allee | Nov. 26, 1935 |
| 2,317,182 | Dickson et al. | Apr. 20, 1943 |
| 2,358,203 | Best | Sept. 12, 1944 |

FOREIGN PATENTS

| Number | Country | Date |
|---|---|---|
| 236,863 | England | July 16, 1925 |
| 298,212 | England | of 1928 |